(12) United States Patent
Rozman et al.

(10) Patent No.: US 9,059,647 B2
(45) Date of Patent: Jun. 16, 2015

(54) HIGH VOLTAGE DC POWER GENERATION

(75) Inventors: Gregory I. Rozman, Rockford, IL (US); Steven J. Moss, Rockford, IL (US); Si J. Fang, Carpentersville, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 878 days.

(21) Appl. No.: 12/947,257

(22) Filed: Nov. 16, 2010

(65) Prior Publication Data

US 2012/0119711 A1    May 17, 2012

(51) Int. Cl.
  H02P 11/00    (2006.01)
  H02P 15/00    (2006.01)
  H02P 9/10     (2006.01)
  H02P 9/30     (2006.01)
  H02P 21/14    (2006.01)

(52) U.S. Cl.
  CPC ...... *H02P 9/105* (2013.01); *H02P 9/30* (2013.01); *H02P 21/146* (2013.01); *H02P 2101/45* (2015.01)

(58) Field of Classification Search
  USPC .................................... 322/46, 44, 20, 22, 24
  See application file for complete search history.

(56) References Cited

U.S. PATENT DOCUMENTS

| | | | |
|---|---|---|---|
| 5,233,286 A * | 8/1993 | Rozman et al. ................ 322/90 |
| 5,461,293 A * | 10/1995 | Rozman et al. ............... 318/603 |
| 5,495,162 A * | 2/1996 | Rozman et al. ................ 322/10 |
| 6,038,152 A * | 3/2000 | Baker ............................. 363/89 |
| 6,686,718 B2 | 2/2004 | Jadric et al. |
| 6,977,827 B2 | 12/2005 | Gritter |
| 7,132,816 B1 | 11/2006 | Markunas et al. |
| 7,271,570 B2 | 9/2007 | O'Gorman et al. |
| 7,327,113 B2 | 2/2008 | Steigerwald et al. |
| 7,400,117 B1 | 7/2008 | Rozman et al. |
| 7,508,086 B2 * | 3/2009 | Huang et al. ................... 290/31 |
| 7,619,327 B2 | 11/2009 | Rozman et al. |
| 7,633,173 B2 | 12/2009 | Keiter et al. |
| 7,646,178 B1 * | 1/2010 | Fradella ......................... 322/46 |
| 7,746,038 B2 | 6/2010 | Maddali et al. |
| 2007/0121354 A1 * | 5/2007 | Jones et al. .................... 363/47 |
| 2009/0009146 A1 * | 1/2009 | Rozman et al. ................ 322/27 |
| 2009/0167255 A1 * | 7/2009 | Rozman et al. ................ 322/25 |
| 2010/0052323 A1 * | 3/2010 | Vyas et al. ..................... 290/44 |
| 2010/0283252 A1 * | 11/2010 | Fradella ......................... 290/55 |
| 2011/0089693 A1 | 4/2011 | Nasiri |
| 2012/0007428 A1 | 1/2012 | Rozman et al. |

FOREIGN PATENT DOCUMENTS

EP    2075899    7/2009
EP    2299586    3/2011

OTHER PUBLICATIONS

European Search Report for Application No. EP 12 16 7404. Mailed on Feb. 7, 2013. 9 pages.

* cited by examiner

*Primary Examiner* — Julio C. Gonzalez
(74) *Attorney, Agent, or Firm* — Cantor Colburn LLP

(57) ABSTRACT

A DC power generating system includes a permanent magnet generator (PMG), an active rectifier in electrical communication with the PMG, and a controller in electrical communication with the active rectifier, wherein the controller is configured to regulate d-q components of a stator current of the PMG in a synchronous reference frame.

19 Claims, 3 Drawing Sheets

HIGH VOLTAGE DC POWER GENERATION

FIELD OF INVENTION

The subject matter disclosed herein relates generally to the field of electric power generating systems (EPGS), and more particularly to high voltage direct current (DC) power generation with active rectification.

DESCRIPTION OF RELATED ART

Generally, DC power generating systems for ground vehicles employ a Permanent Magnet Generator (PMG) and active rectifier. Generator design must accommodate back EMF requirements in consideration of controllability range of active rectifier within operating rotational speed of PMG. There may be a need to improve performance of voltage regulation in the presence of constant power loads and increase active rectifier operating range due to the large PMG speed range variation.

BRIEF SUMMARY

According to one aspect of the invention, a DC power system includes a permanent magnet generator (PMG), an active rectifier in electrical communication with the PMG, and a controller in electrical communication with the active rectifier, wherein the controller is configured to regulate d-q components of a stator current of the PMG in a synchronous reference frame.

According to another aspect of the invention, a DC power system includes a permanent magnet generator (PMG), an active rectifier in electrical communication with the PMG, and a controller in electrical communication with the active rectifier, wherein the controller is configured to regulate d-q components of a stator current of the PMG in a synchronous reference frame based upon voltage feedback of the active rectifier, current feedback of the active rectifier, an estimated speed of the PMG, and an estimated angle of power generated at the PMG.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a DC power generating system are provided herein, with example embodiments being discussed below in detail. According to example embodiments, technical benefits and improvements in voltage regulation through active control reduce requirements with regards to the size of a dc link capacitor within the DC power generating system, resulting in improved weight, size and cost.

Figure 1:
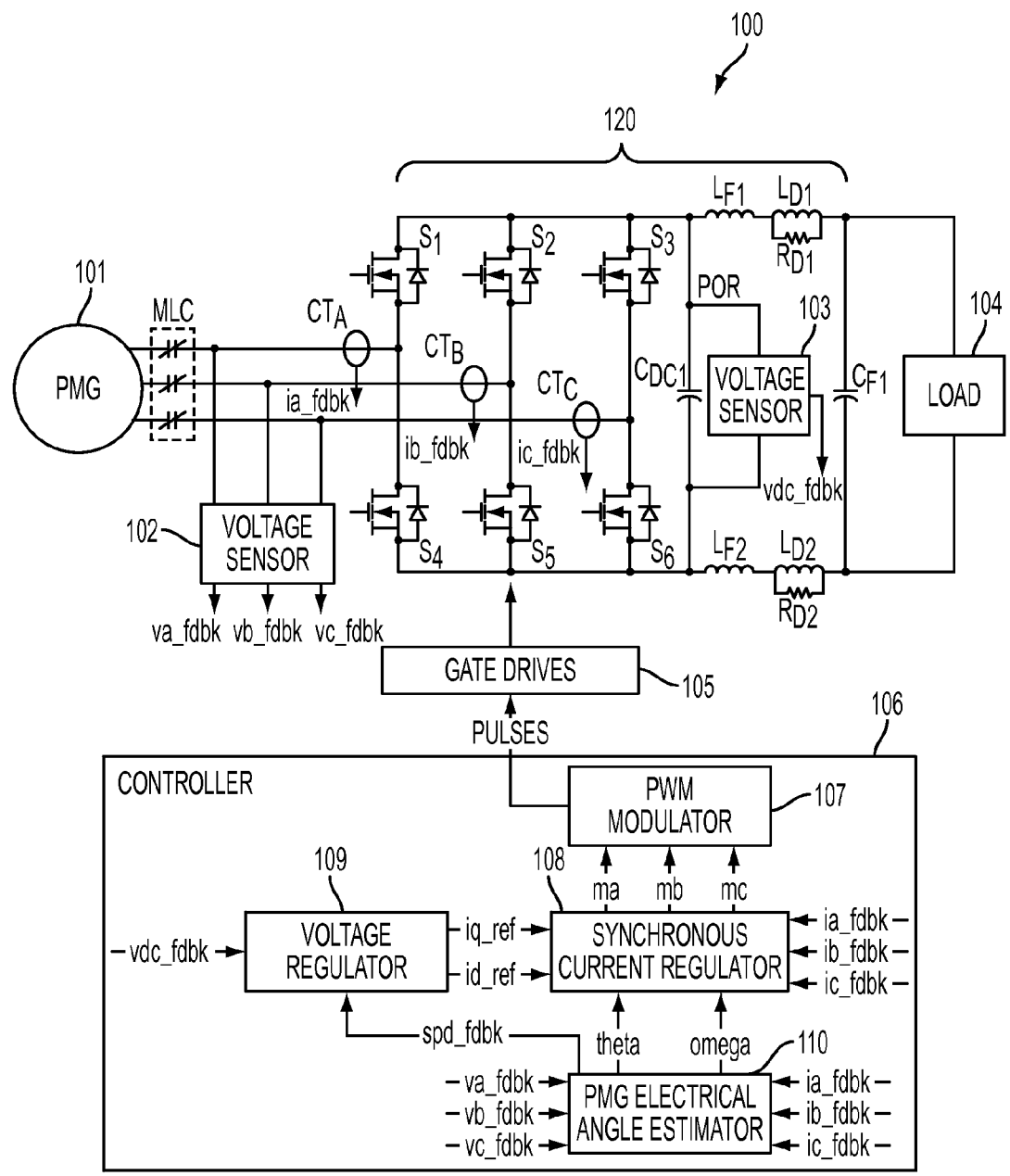
FIG. 1 illustrates a DC power generating system, according to an example embodiment.

Turning to FIG. 1, a DC power system is shown. The DC power system 100 may be a power system of a vehicle, for example, a car, truck, or other ground vehicle. As illustrated, the system 100 includes a permanent magnet generator (PMG) 101.

The system 100 further includes voltage sensor 102 in communication with each phase output of the PMG 101. The voltage sensor 102 is configured to provide voltage feedback signals for each phase output of the PMG 101.

The system 100 further includes active rectifier 120 in electrical communication with PMG 101 through a safety Main Line Contactor (MLC). The active rectifier 120 includes a plurality of switches $S_1$, $S_2$, $S_3$, $S_4$, $S_5$, and $S_6$ configured to switch on/off in response to pulse width modulated (PWM) signals applied from a gate drive 105. The active rectifier 120 further includes a plurality of current transducers $CT_A$, $CT_B$, and $CT_C$ configured to provide current feedback from each phase output of the PMG 101. The current transducers $CT_A$, $CT_B$, and $CT_C$ are arranged at input portions of respective switches of the plurality of switches $S_1$, $S_2$, $S_3$, $S_4$, $S_5$, and $S_6$.

The active rectifier 101 further includes DC capacitor $C_{DC1}$ coupled across outputs of each switch of the plurality of switches $S_1$, $S_2$, $S_3$, $S_4$, $S_5$, and $S_6$, and voltage sensor 103 coupled in parallel across the DC capacitor $C_{DC1}$. The voltage sensor 103 is configured to provide voltage feedback for the active rectifier 120. The active rectifier 120 further includes inductances $L_{F1}$ and $L_{D1}$ arranged serially along a first rail of a DC output bus of the active rectifier 120, and inductances $L_{F2}$ and $L_{D2}$ arranged serially along a second rail of the DC output bus of the active rectifier 120. Resistances $R_{D1}$ and $R_{D2}$ may further be arranged on the DC output bus, in parallel communication with inductances $L_{D1}$ and $L_{D2}$, respectively. Furthermore, a filter capacitor $C_{F1}$ may be arranged across the DC output bus.

The system 100 further includes load 104 in communication with the active rectifier 120. The load 104 may be any suitable DC load applied to the DC output bus of the active rectifier 120. For example, as described above, the DC load may be a relatively large and constant DC load.

The system 100 further includes the gate drives 105 in communication with the active rectifier 120. The gate drive 105 may be configured to open and close each of the plurality of switches $S_1$, $S_2$, $S_3$, $S_4$, $S_5$, and $S_6$.

The system 100 further includes controller 106 in communication with the gate drives 105. The controller 106 is configured to apply a pulse width modulated (PWM) signal to the gate drives 105. The controller 106 includes a PWM modulator 107 configured to provide the PWM signal.

The controller 106 further includes synchronous current regulator 108 in communication with the PWM modulator 107 and the active rectifier 120. For example, the synchronous current regulator 108 may be in communication with the plurality of current transducers $CT_A$, $CT_B$, and $CT_C$ of the active rectifier 120. The synchronous current regulator 108 is described more fully below, with reference to FIG. 3.

The controller 106 further includes voltage regulator 109 in communication with the synchronous current regulator 108 and the active rectifier 120. For example, the voltage regulator 109 may be in communication with the voltage sensor 103 of the active rectifier 120. The voltage regulator 109 is described more fully below, with reference to FIG. 2.

The controller 106 further includes PMG electrical angle estimator 110 in communication with the voltage regulator 109, the synchronous current regulator 108, and the voltage sensor 102. The PMG electrical angle estimator 110 may be configured to estimate an electrical angle of power generated at PMG 101, and provide the estimation to synchronous current regulator 108. Furthermore, the PMG electrical angle estimator 110 may be configured to estimate a rotational speed of the PMG 101 and provide the speed estimation to the voltage regulator 109. An example PMG electrical angle estimator is described in detail in U.S. Pat. No. 7,072,790, entitled "SHAFT SENSORLESS ANGULAR POSITION AND VELOCITY ESTIMATION FOR A DYNAMOELECTRIC MACHINE BASED ON EXTENDED ROTOR FLUX," which is hereby incorporated by reference in its entirety.

Figure 2:
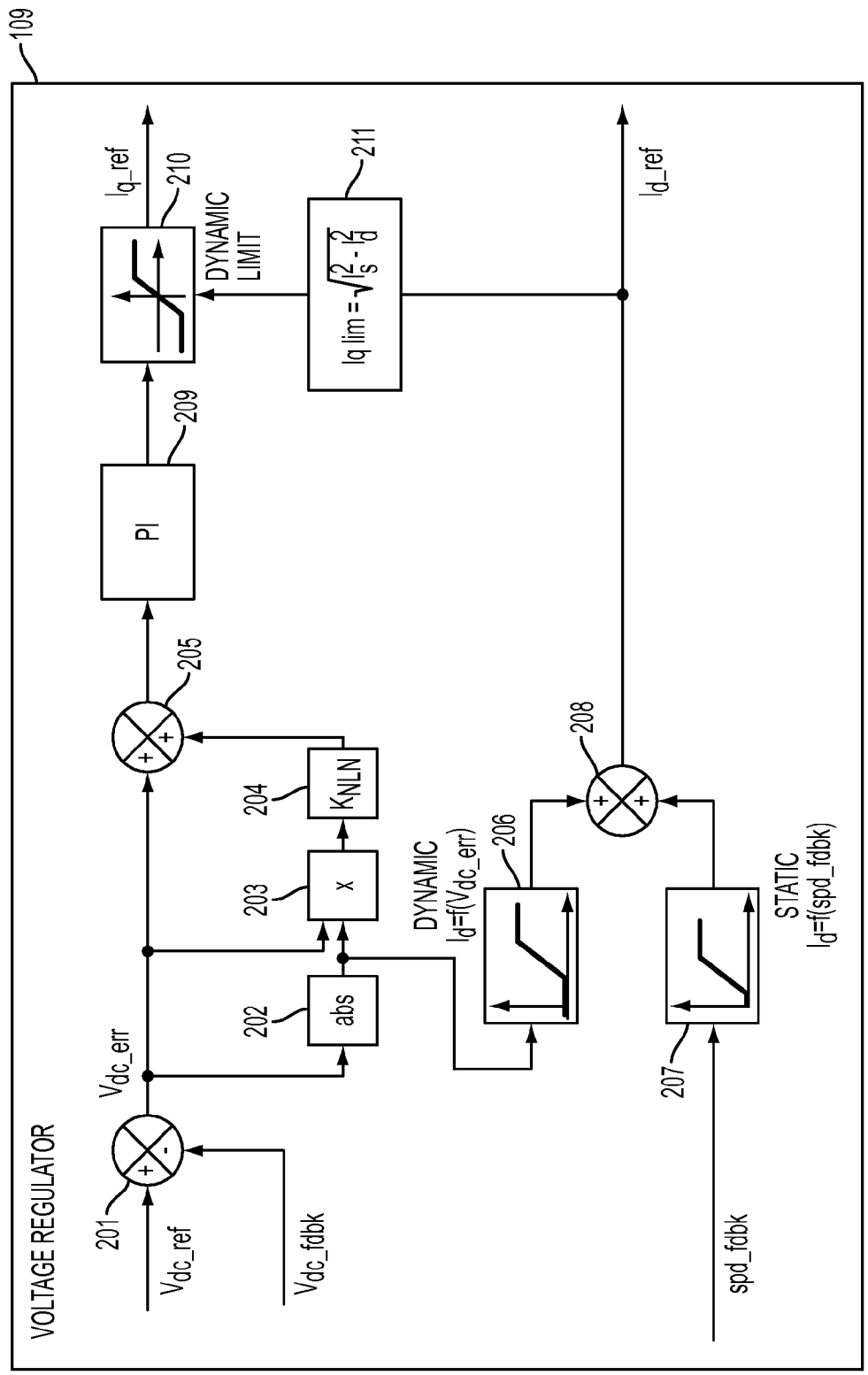
FIG. 2 illustrates a voltage regulator, according to an example embodiment.

FIG. 2 illustrates voltage regulator 109, according to an example embodiment. The voltage regulator 109 includes nonlinear gain/amplification to improve dynamic performance of the DC output bus of the active rectifier 120 during load transients. As illustrated, the voltage regulator 109 receives a reference voltage and feedback voltage from an active rectifier (e.g., active rectifier 120). The difference (e.g., voltage error) between the reference and feedback voltages are determined at summer 201. The nonlinear gain (204) of the absolute value (202) of the voltage error is summed with the voltage error at block 205 to provide square function of voltage error to proportional integral (PI) block 209. A q-component of the reference current $I_{q\_ref}$ (to be provided to synchronous current regulator 108), is determined through the dynamic limit of the PI as a function of d-component of the current reference and the magnitude of a stator current of the PMG 101. This dynamic limit (210-211) facilitates maintaining the stator current within predetermined levels.

A d-component of the reference voltage, current $I_{d\_ref}$ (e.g., reference current to be provided to synchronous current regulator 108), is determined through summer 208 of appropriate Id portions of the stator current. The Id component of the stator current increases dynamically (206) as a function of the voltage error determined through blocks 201-202, and increases statically (207) as a function of PMG rotational speed.

Figure 3:
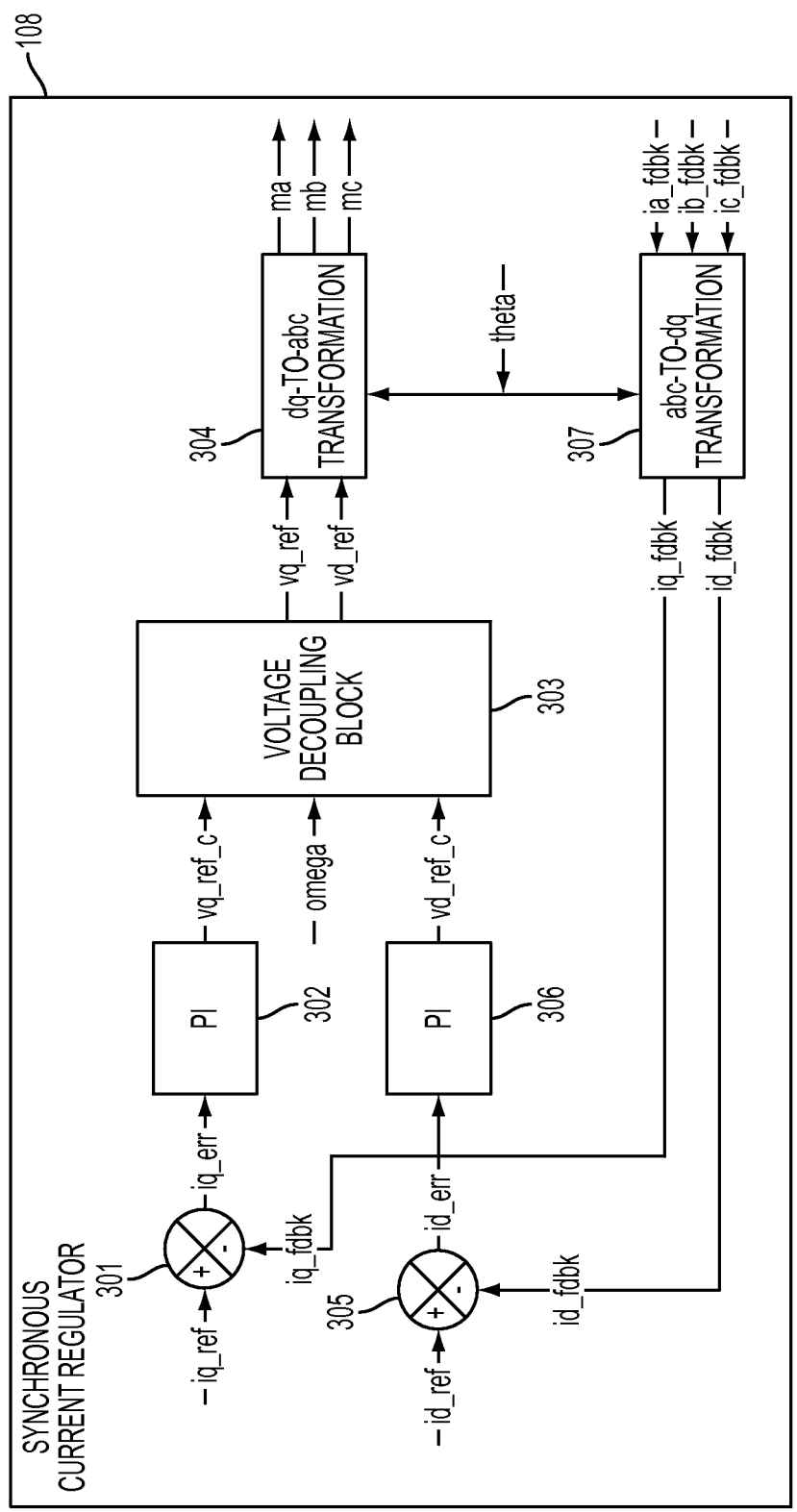
FIG. 3 illustrates a synchronous current regulator, according to an example embodiment.

As illustrated in FIG. 1, the currents $I_{q\_ref}$ and $I_{d\_ref}$ are provided to synchronous current regulator 108. FIG. 3 illustrates synchronous current regulator 108, according to an example embodiment.

The synchronous current regulator 108 controls d-q components of the stator current of the PMG 101 in a synchronous reference frame. The synchronous current regulator 108 determines appropriate modulation signals ma, mb, and mc for rectification of each phase output of the PMG. The modulation signals are derived on the output of dq-to-abc transformation block 304 in response to the d-q components (vq_ref and vd_ref) of the stator phase voltage reference. D-q components of the stator phase voltage vector (vq_ref_c and vd_ref_c) are derived on the outputs of proportional integral blocks 302, 306, respectively in response to the current errors (iq_err and id_err). For example, the current error of $I_{q\_ref}$ is determined through summing of $I_{q\_ref}$ and the q-component (iq_fdbk) of the feedback currents received from current transducers $CT_A$, $CT_B$, and $CT_C$ of the active rectifier 120, at block 301. Further, the current error of current $I_{d\_ref}$ is determined through summing of $I_{d\_ref}$ and the d-component (id_fdbk) of the feedback currents received from current transducers $CT_A$, $CT_B$, and $CT_C$ of the active rectifier 120, at block 305. Both iq_fdbk and id_fdbk are transformed through abc-to-dq transformation block 307, using the angle theta estimated through the angle estimator 110, and the feedback currents received from current transducers $CT_A$, $CT_B$, and $CT_C$ of the active rectifier 120. The d-q components (vq_ref and vd_ref) of the voltage vector are decoupled at voltage decoupling block 303. The voltage decoupling block 303 improves stability of the current loops and may be optional.

If the voltage decoupling block 303 is implemented, the decoupled reference values are transformed at block 304 to produce the appropriate modulation signals ma, mb, and mc using the angle theta estimated through the angle estimator 110, for rectification of each phase output of the PMG. The decoupling may be implemented through Equations 1 and 2, below:

$$v_{d\_ref} = V_{d\_ref\_c} = \text{omega} * L_d * i_{q\_fdbk} \quad \text{Equation 1:}$$

$$v_{q\_ref} = V_{q\_ref\_c} - \text{omega} * L_q * i_{d\_fdbk} \quad \text{Equation 2:}$$

According to Equations 1 and 2, above, Ld and Lq are d- and q-axis stator self-inductances of the PMG 101.

Alternatively, if the voltage decoupling block 303 is not implemented, outputs of blocks 302 and 306 may be directly transformed at block 304 to produce the appropriate modulation signals ma, mb, and mc using the angle theta estimated through the angle estimator 110, for rectification of each phase output of the PMG.

According to the embodiments above, electrical angle estimation, speed estimation, and d-q components of the reference voltages and currents of the active rectifier 120 may be utilized to establish a PWM scheme through the controller 106 which increases response of a DC output bus of the active rectifier 120. In this manner, DC output voltage is maintained at a relatively constant level negating the necessity of a large DC bus capacitor. Therefore, technical effects and benefits of example embodiments include an increase in DC bus voltage regulation across a wide speed range, improved dynamic performance during large load application and removal, improved DC bus stability during large, constant load application, and reduction in the size, cost, and weight of DC power generating systems.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A DC power system, comprising:
a permanent magnet generator (PMG);
an active rectifier in electrical communication with the PMG; and
a controller in electrical communication with the active rectifier, wherein the controller is configured to regulate d-q components of a stator current of the PMG in a synchronous reference frame,
wherein the controller includes a synchronous current regulator in electrical communication with the active rectifier, and wherein the synchronous current regulator is configured to provide a pulse width modulation (PWM) scheme to the active rectifier based on d-q components of reference voltages of the active rectifier, and
wherein the controller further includes a nonlinear voltage regulator in communication with the synchronous current regulator, and
wherein the nonlinear voltage regulator is configured to provide d-q components of a reference current to the synchronous current regulator, and wherein the controller further includes an electrical angle estimator in communication with the PMG and the synchronous current regulator, and wherein the electrical angle estimator is configured to estimate a speed of the PMG and an angle of power generated at the PMG, and wherein the nonlinear voltage regulator is in communication with the electrical angle estimator, and wherein the voltage regulator is configured to provide d-q components of a feedback voltage output at the active rectifier to the synchronous current regulator, the d-q components of the feedback voltage output being based on the estimated speed of the PMG and the feedback voltage.

2. The system of claim 1, wherein the synchronous current regulator is configured to regulate the d-q components of the stator current.

3. The system of claim 1, wherein the controller further includes a pulse width modulation (PWM) modulator in communication with the synchronous current regulator and the active rectifier, the PWM modulator configured to control the active rectifier based on the regulated d-q components of the stator current.

4. The system of claim 1, wherein the synchronous current regulator is configured to provide a pulse width modulation (PWM) scheme to the active rectifier through regulation of the d-q components of the stator current.

5. The system of claim 1, wherein the synchronous current regulator is configured provide to a pulse width modulation (PWM) scheme to the active rectifier based on proportional integrals of current errors of the active rectifier.

6. The system of claim 1, wherein the nonlinear voltage regulator comprises a nonlinear section configured to reject load transients.

7. The system of claim 6, wherein the nonlinear section comprises a nonlinear gain of an absolute value of a voltage error that is summed with the voltage error, and wherein the voltage error corresponds to a difference between a feedback voltage and the reference voltages of the active rectifier.

8. The system of claim 7, wherein the nonlinear gain is proportional to a square function of the voltage error.

9. The system of claim 7, wherein the nonlinear section comprises a static component that is responsive to PMG speed and a dynamic component that is responsive to the absolute value of the voltage error to control the d component of the reference current.

10. The system of claim 6, wherein the nonlinear section comprises a dynamic limit configured to maintain the q component of the reference current within predetermined levels.

11. The system of claim 10, wherein the dynamic limit comprises a square root function.

12. A DC power system, comprising:
a permanent magnet generator (PMG);
an active rectifier in electrical communication with the PMG; and
a controller in electrical communication with the active rectifier, wherein the controller is configured to regulate d-q components of a stator current of the PMG in a synchronous reference frame,
wherein the controller includes a synchronous current regulator in electrical communication with the active rectifier, and wherein the synchronous current regulator is configured to provide a pulse width modulation (PWM) scheme to the active rectifier based on d-q components of reference voltages of the active rectifier, and
wherein the controller further includes a nonlinear voltage regulator in communication with the synchronous current regulator, and wherein the nonlinear voltage regulator is configured to provide d-q components of a reference current to the synchronous current regulator,
wherein the controller includes:
an electrical angle estimator in communication with the synchronous current regulator and the nonlinear voltage regulator,
wherein the electrical angle estimator is configured to estimate an angle of power generated at the PMG and a speed of the PMG, wherein the nonlinear voltage regulator is configured to determine the d-q components of the reference voltages of the active rectifier based upon the reference voltages and the estimated speed, and wherein the synchronous current regulator is configured to regulate the d-q components of the stator current based on the d-q components of the reference voltages and the estimated angle.

13. A DC power system, comprising:
a permanent magnet generator (PMG);
an active rectifier in electrical communication with the PMG; and
a controller in electrical communication with the active rectifier, wherein the controller is configured to regulate d-q components of a stator current of the PMG in a synchronous reference frame based upon voltage feedback of the active rectifier, current feedback of the active rectifier, an estimated speed of the PMG, and an estimated angle of power generated at the PMG,
wherein the controller includes a synchronous current regulator in electrical communication with the active rectifier, and wherein the synchronous current regulator is configured to provide a pulse width modulation (PWM) scheme to the active rectifier based on the d-q components of reference voltages of the active rectifier, and
wherein the controller further includes a nonlinear voltage regulator in communication with the synchronous current regulator, and
wherein the nonlinear voltage regulator is configured to provide d-q components of a reference current to the synchronous current regulator,
wherein the controller includes:
an electrical angle estimator in communication with the synchronous current regulator and the nonlinear voltage regulator, and
wherein the electrical angle estimator is configured to estimate the angle and the speed, wherein the nonlinear voltage regulator is configured to determine the d-q components of the reference voltages of the active rectifier based upon the reference voltages and the estimated speed, and wherein the synchronous current regulator is configured to regulate the d-q components of the stator current based on the d-q components of the reference voltages and the estimated angle.

14. The system of claim 13, wherein the synchronous current regulator is configured to regulate the d-q components of the stator current based upon the d-q components of the reference voltages, d-q components of the current feedback, and the estimated angle.

15. The system of claim 13, wherein the controller further includes an electrical angle estimator in communication with the PMG and the synchronous current regulator, and wherein the electrical angle estimator is configured to estimate the speed and estimate the angle.

16. The system of claim 15, wherein the nonlinear voltage regulator is in communication with the electrical angle estimator, and wherein the nonlinear voltage regulator is configured to provide the d-q components of the feedback voltage.

17. The system of claim 16, wherein the controller further includes a pulse width modulation (PWM) modulator in communication with the synchronous current regulator and the active rectifier, the PWM modulator configured to control the active rectifier based on the regulated d-q components of the stator current.

18. The system of claim 13, wherein the synchronous current regulator is configured to provide a pulse width modulation (PWM) scheme to the active rectifier.

19. The system of claim 13, wherein the synchronous current regulator is configured provide to a pulse width modulation (PWM) scheme to the active rectifier based on proportional integrals of current errors of the active rectifier.

* * * * *